United States Patent Office 3,308,036
Patented Mar. 7, 1967

3,308,036
PROCESS FOR THE PRODUCTION OF RIBONU-
CLEOTIDES BY FERMENTATION
Kiyoshi Nakayama, Sagamihara-shi, Zenroku Sato, Machida-shi, and Haruo Tanaka, Tokyo, Japan, assignors to Kyowa Hakko Kogyo Co., Ltd., Tokyo, Japan, a corporation of Japan
No Drawing. Filed Nov. 25, 1964, Ser. No. 413,994
Claims priority, application Japan, Nov. 27, 1963, 38/63,231
14 Claims. (Cl. 195—28)

This invention relates to a process for the production of ribonucleotides. More particularly it relates to a process for the production of 5'-ribonucleotides, i.e., 5'-ribosyl phosphates, including monophosphates, diphosphates and triphosphates, of purine base compounds. The purine base compounds of which the instant 5'-ribosyl phosphates are derivatives are compounds of the formula:

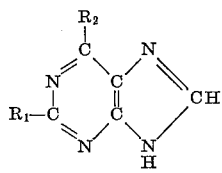

wherein
$R_1$ is hydrogen or an amino group, as for example amino, lower alkyl-amino (e.g., methylamino and ethylamino), and dilower alkylamino (e.g., dimethylamino and diethylamino);
$R_2$ being an amino group, as for example, amino, lower alkylamino (e.g., methylamino or ethylamino), and dilower alkylamino (e.g. dimethylamino and diethylamino), or a mercapto group, as for example, SH and S-lower alkyl (e.g., S-methyl) when $R_1$ is an amino group, and
$R_2$ being a mercapto group when $R_1$ is hydrogen.

In a preferred aspect, the invention relates to the production of 5'-ribosyl phosphates of purine base compounds of the formula

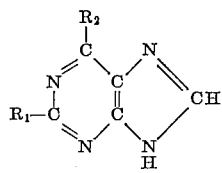

wherein
$R_1$ is H or $NH_2$, and
$R_2$ is $NH_2$ or SH when $R_1$ is $NH_2$, and
$R_2$ is SH when $R_1$ is H.

The 5'-ribosyl phosphates of the purine base compounds which are produced by the instant process are compounds of the formula

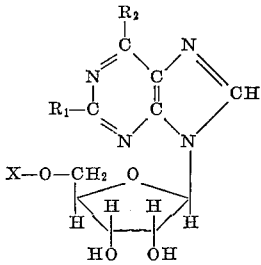

wherein X represents

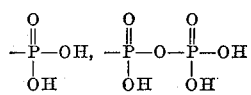

or

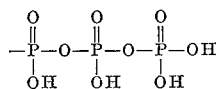

and $R_1$ and $R_2$ are as defined in Formula I.

The instant invention provides a process wherein the 5'-ribonucleotides of the purine base compounds may be produced economically and on an industrial scale.

The purine bases of the above Formula I have recently acquired importance in the investigations relating to the treatment of leukemia, as for example 6-mercaptopurine. The ribosyl phosphates of these purine bases have also recently come into importance in investigations relating to similar utility.

Various investigations have been made into the methods for producing nucleotides utilizing microorganisms. As a result, it has now been found that when a microorganism which is a bacterium belonging to *Brevibacterium ammoniagenes* is cultivated in a medium containing a purine base compound of the Formula I, or a derivative thereof such as the riboside thereof, at any time during cultivation, remarkable quantities of 5'-ribosyl phosphates of the said purine base compounds are formed and accumulate in the medium. When used in the instant specification and claims, the term "purine base compound" is intended to encompass the functional derivatives thereof such as the salts which yield the free base in the fermentation medium.

This is a phenomenon which has previously been unknown and the present invention is based upon this discovery.

The special features of this invention are (1) a purine base compound of the above Formula I or the riboside thereof is present in the fermentation medium employed and (2) a bacterium belonging to *Brevibacterium ammoniagenes* is employed as the cultivated microorganism.

As the medium employed in this invention, any of the media which contain a carbon source such as carbohydrates and the like (for example, glucose, hydrolysis product of starch and molasses), a nitrogen source (for example, urea, ammonium chloride and ammonium nitrate), inorganic substances (for example, potassium phosphates, magnesium sulfate and calcium chloride) and nitrogen-containing natural products (for example, corn steep liquor, yeast extract, peptone and fish meal), in the proper ratio, are employed. These media are well known in the art. When a specific nutrient-requiring strain of *Brevibacterium ammoniagenes* is employed, the substances which satisfies the growth requirements of the strain must, of course, be contained in the medium.

According to the invention, the purine base compound or the riboside thereof present in the medium can be present at the commencement of the fermentation or it can be added to the fermentation medium during the course of the fermentation. When it is added during the course of the fermentation, it can be added at one time or in several portions. In addition the purine base compound can be that which is formed in the medium during the fermentation due to the properties of the strain of *Brevibacterium ammoniagenes* being used. Additionally, as previously indicated by the definition of "a purine base compound," the purine base compound present can be that which is formed in situ in the medium from a derivative of the purine base as for example a salt, e.g. a sulphate, which derivative is added to the medium at the beginning of the fermentation or during the course of the fermentation.

The amount of the purine base compound employed in the present invention and which is added to the medium will vary over a wide range. It will be somewhat dependent upon the specific strain of the bacterium used.

In general it will be in the range of from about 0.1 gram to about 10 grams per liter of medium. It is preferred that the amount to be in the range of from 1 to 5 grams per liter of fermentation medium. In the event a compound which yields purine base compound under the conditions of the fermentation is employed then the amount of the compound will be selected so that the proper amount of purine base compound is present in the medium during the fermentation.

The fermentation is performed under aerobic conditions, for example in a shaking culture or submerged culture with aeration and stirring at a temperature between 20° C. and 40° C. and at a pH between 5.5 and 9.0. The period of cultivation is generally 2 to 8 days and remarkable quantities of the 5'-ribosyl phosphates of the purine base compound are formed and accumulate in the medium and the cells.

The 5'-ribosyl phosphates of the purine base compound can be isolated or recovered from the medium after completion of cultivation by the treatments which are, per se, known in the art, as for example ion-exchange resin treatment, adsorption process, precipitation process, extraction process, and the like.

The following examples are submitted in order to illustrate the invention. They are not to be construed as in any limiting the invention. Percentages are by weight unless otherwise indicated.

EXAMPLE 1

An inoculant culture is prepared by cultivating *Brevibacterium ammoniagenes* (ATCC 6872) in a medium containing 2% of glucose, 1% of peptone, 1% of yeast extract, 0.3% of NaCl and 30 micrograms per liter (mg./l.) of biotin, at 30° C. for 24 hours. The fermentation is inoculated with 10% (by volume) of this inoculant culture. Both media are used after placing 20 milliliters (ml.) portions of them in 250 ml. Erlenmeyer flasks and then sterilizing them. The fermentation medium has the following composition and cultivation is performed at 30° C. in a shaking culture.

Composition of the fermentation medium:

| | Grams |
|---|---|
| Glucose | 100 |
| Urea | 6 |
| $KH_2PO_4$ | 10 |
| $K_2HPO_4$ | 10 |
| $MgSO_4 \cdot 7H_2O$ | 10 |
| $CaCl_2 \cdot 2H_2O$ | 0.1 |
| Yeast extract | 10 |
| Biotin | 30μ |

The above quantities are dissolved in water and the solution made up to one liter. Then the above-mentioned portions of thus prepared solution are put in flasks after adjustment of the pH to 8.0 with NaOH and sterilized in an autoclave under a pressure of 1 kilogram per square centimeter (kg./cm.²) for 10 minutes.

When 2,6-diaminopurine sulfate is added to the fermentation medium after 72 hours' cultivation, at the ratio of 2 milligrams per milliliter (mg./ml.) of the fermentation medium and cultivation is continued for further 24 hours, 2.3 mg./ml. of 2,6-diaminopurine ribosyl-5'-triphosphate is formed and accumulates together with small quantities of the corresponding diphosphate and monophosphate, in the fermentation medium.

Thus produced 5'-ribosyl phosphates of 2,6-diaminopurine are recovered by means of ion exchange resin treatment in the following manner: The filtrate (1.2 liters) obtained by removing the cells from fermentation broth is treated with active carbon and the 5'-ribosylphosphates of 2,6-diaminopurine absorbed on the carbon are eluted with 50% aqueous ethanol containing 3% ammonia. The ammonia in the eluate is removed by evaporation under vacuum. The solution thus obtained is passed through the resin tower of a polystyrene strongly basic anion exchange resin Dowex 1 x 2 (Cl-type), the resin tower which absorbed the 5-ribosylphosphates of 2,6-diaminopurine is washed with water, eluted gradiently with 0.01 N HCl, 0.05 N HCl, 0.1 N HCl and 0.5 N HCl, in this order. The eluate fractions each containing 2,6-diaminopurine ribosyl-5'-triphosphate, 2,6-diaminopurine ribosyl-5'-diphosphate and 2,6-diaminopurine ribosyl-5'-monophosphate are condensed and cooled after the addition of ethanol. The 5'-ribosylphosphates of 2,6-diaminopurine precipitated are recovered by centrifuge and dried (yield of 2,6-diaminopurine-5'-triphosphate is 0.9 g.).

EXAMPLE 2

0.84 mg./ml. of 2-amino-6-mercaptopurine-ribosyl-5'-diphosphate and a small quantity of the corresponding triphosphate are formed and accumulated in the fermentation medium, when the fermentation is carried out in the same manner as in Example 1, except that 2-amino-6-mercaptopurine is added after 72 hours' cultivation.

EXAMPLE 3

Cultivation is carried out in the same manner as in Example 1, except that *Brevibacterium ammoniagenes* ATCC 6871 is used, 0.6 mg./ml. of 2,6-diaminopurine ribosyl-5'-triphosphate and small quantities of the corresponding diphosphate and monophosphate are formed and accumulate in the fermentation medium.

EXAMPLE 4

Cultivation is carried out in the same manner as in Example 1, except that *Brevibacterium ammoniagenes* KY 3464 (ATCC No. 15750) is used. 3.1 mg./ml. of 2,6-diaminopurine ribosyl-5'-triphosphate and small quantities of the corresponding diphosphate and monophosphate are formed and accumulate in the fermentation medium.

EXAMPLE 5

Cultivation is carried out in the same manner as in Example 1, except that *Brevibacterium ammoniagenes* KY 3464 (ATCC No. 15751) is used. 3.2 mg./ml. of 2,6-diaminopurine ribosyl-5'-triphosphate and small quantities of the corresponding diphosphate and monophosphate are formed and accumulate in the fermentation medium.

In the same manner as in the preceding examples, additional strains of *Brevibacterium ammoniagenes* may be cultured in a fermentation medium containing other purine base compounds of Formula I to obtain 5'-ribosyl phosphates of the purine base compound in substantially similar yields.

What is claimed is:

1. A process for the production of 5'-ribosyl phosphate of purine base of the formula

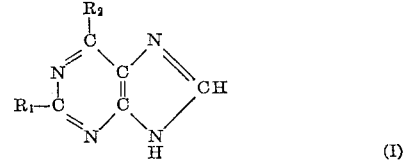

(I)

wherein $R_1$ represents a member selected from the group consisting of H and amino, lower alkylamino and di-lower alkylamino, and $R_2$ represents a member selected from the group consisting of amino, lower alkylamino, di-lower alkylamino and mercapto when $R_1$ is other than H, and $R_2$ represents mercapto when $R_1$ is H, which comprises aerobically culturing a bacterium belonging to *Brevibacterium ammoniagenes* in a fermentation medium therefor which, in addition to the normal constituents thereof, contains a member selected from the group consisting of a purine base compound of Formula I and a riboside thereof, and recovering the accumulated 5′-ribosyl phosphate.

2. A process for the production of 5′-ribosyl phosphate of purine base of the formula

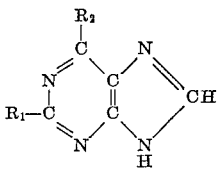
(I)

wherein

R₁ represents a member selected from the group consisting of H and amino, lower alkylamino and di-lower alkylamino, and R₂ represents a member selected from the group consisting of amino, lower alkylamino, di-lower alkylamino and mercapto when R₁ is other than H, and R₂ represents mercapto when R₁ is H, which comprises aerobically culturing a bacterium belonging to *Brevibacterium ammoniagenes* in a fermentation medium therefor which in addition to the normal constituents thereof contains a purine base compound of Formula I, and recovering the accumulated 5′-ribosyl phosphate.

3. A process as in claim 2 wherein the purine base compound is added to the fermentation medium during the culturing of the bacterium.

4. A process for the production of 5′-ribosyl phosphate of purine base of the formula

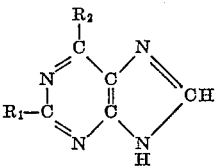
(I)

wherein

R₁ represents a member selected from the group consisting of H and amino, lower alkylamino and di-lower alkylamino, and R₂ represents a member selected from the group consisting of amino, lower alkylamino, di-lower alkylamino and mercapto when R₁ is other than H, and R₂ represents mercapto when R₁ is H, which comprises aerobically culturing a bacterium belonging to *Brevibacterium ammoniagenes* in a fermentation medium therefor which in addition to the normal constituents thereof contains a purine base compound of the Formula I at a concentration of from about 0.1 to about 10 grams per liter of medium, at a temperature of from 20° to 40° C. and at a pH of from 5.5 to 9 and recovering the accumulated 5′-ribosyl phosphate.

5. A process as in claim 1 wherein the purine base compound is formed in situ in the medium from 2,6-diaminopurine sulfate.

6. A process for the production of 5′-ribosyl phosphate of purine base of the formula

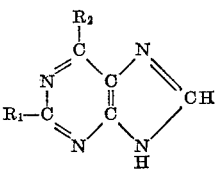
(II)

wherein

R₁ is a member selected from the group consisting of H, amino, lower alkylamino and di-lower alkylamino, and R₂ is a member selected from the group consisting of amino, lower alkylamino, di-lower alkylamino and mercapto when R₁ is other than H, and R₂ is mercapto when R₁ is H, which comprises aerobically culturing *Brevibacterium ammoniagenes* (ATCC No. 6872) in a culture medium therefor which in addition to the normal constituents thereof contains a purine base compound of Formula II, and recovering the accumulated 5′-ribosyl phosphate.

7. A process for the production of 5′-ribosyl phosphate of 2,6-diaminopurine which comprises aerobically culturing *Brevibacterium ammoniagenes* (ATCC No. 6872) in a culture medium therefor which in addition to the normal constituents thereof contains 2,6-diaminopurine, and recovering the accumulated 5′-ribosyl phosphate.

8. A process for the production of 5′-ribosyl phosphates of 2-amino-6-mercaptopurine which comprises culturing *Brevibacterium ammoniagenes* (ATCC No. 6872) in a culture medium therefor which in addition to the normal constituents thereof contains 2-amino-6-mercaptopurine, and recovering the accumulated 5′-ribosyl phosphate.

9. A process as in claim 7 wherein the 2,6-diaminopurine in the fermentation medium is produced in situ in the medium from 2,6-diaminopurine sulfate which is added to the medium during the fermentation of the microorganism.

10. In the process for the fermentative production of 5′-ribosyl phosphate of a purine base by aerobically culturing a microorganism in a fermentation medium, and recovering the accumulated 5′-ribosyl phosphate, the improvement wherein the purine base compound is a compound of the formula

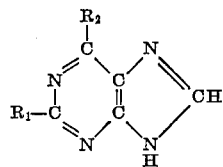
(II)

wherein

R₁ represents a member selected from the group consisting of H and NH₂, and

R₂ represents a member selected from the group consisting of NH₂ and —SH when R₁ is NH₂, and R₂ represents SH when R₁ is H, the microorganism is a bacterium belonging to *Brevibacterium ammoniagenes* and the fermentation medium contains a purine base compound of Formula II.

11. A process as in claim 10 wherein the microorganism is *Brevibacterium ammoniagenes* (ATCC No. 6872).

12. A process as in claim 10 wherein the microorganism is *Brevibacterium ammoniagenes* (ATCC No. 6871).

13. A process as in claim 10 wherein the microorganism is *Brevibacterium ammoniagenes* KY 3464 (ATCC No. 15750).

14. A process as in claim 10 wherein the microorganism is *Brevibacterium ammoniagenes* KY 3465 (ATCC No. 15751).

References Cited by the Examiner

FOREIGN PATENTS 827,441  2/1963  Great Britain.

A. LOUIS MONACELL, *Primary Examiner.*

ALVIN E. TANENHOLTZ, *Examiner.*